United States Patent
Yousuf

(10) Patent No.: US 7,525,931 B2
(45) Date of Patent: Apr. 28, 2009

(54) WIRELESS MULTIPLEX SYSTEMS AND METHODS FOR CONTROLLING DEVICES IN A VEHICLE

(75) Inventor: Mohammed Yousuf, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 603 days.

(21) Appl. No.: 10/953,957

(22) Filed: Sep. 29, 2004

(65) Prior Publication Data
US 2006/0067259 A1  Mar. 30, 2006

(51) Int. Cl.
*B60R 25/10* (2006.01)
*H04M 3/00* (2006.01)

(52) U.S. Cl. .................. 370/310; 455/420; 340/426.13; 340/426.16

(58) Field of Classification Search ......... 455/419–420; 340/426.2, 426.28–426.29, 539.17, 539.22, 340/5.2, 5.72; 370/310
See application file for complete search history.

(56) References Cited

U.S. PATENT DOCUMENTS

| 4,897,643 A * | 1/1990 | Shibata et al. ............. 340/5.72 |
| 6,573,831 B2 * | 6/2003 | Ikeda et al. ................. 340/505 |
| 7,106,171 B1 * | 9/2006 | Burgess ..................... 340/5.72 |
| 2005/0040969 A1 * | 2/2005 | Heyn ...................... 340/825.72 |
| 2006/0031675 A1 * | 2/2006 | Zhang et al. ................ 713/168 |

* cited by examiner

*Primary Examiner*—Alexander Eisen
*Assistant Examiner*—Michael T Thier

(57) ABSTRACT

Methods and apparatuses for communicating wireless messages for controlling the functions of devices within a vehicle are provided. The apparatus comprises a first module having a first wireless control node positioned at a first location within the vehicle. The apparatus also includes a second module having a second wireless control node positioned at a second location within the vehicle. Devices are coupled to and controlled by each of the nodes. The first and second nodes are adapted to form a virtual network so that they can communicate the messages to each other for also controlling the devices. The apparatus also has a third wireless node positioned external to the vehicle. The third node is capable of becoming part of the virtual network so that the third node can communicate messages to at least one of the first and the second nodes to further control at least one of the devices.

12 Claims, 10 Drawing Sheets

WIRELESS MULTIPLEX SYSTEMS AND METHODS FOR CONTROLLING DEVICES IN A VEHICLE

TECHNICAL FIELD

The present invention relates generally to wireless control systems and methods, and more specifically to wireless multiplex systems and methods for controlling devices in an automotive vehicle.

BACKGROUND

Modern automotive vehicle architectures provide many features or functions to accommodate the needs and desires of drivers and passengers. This is particularly true of luxury automobiles, sport utility vehicles and trucks. Such functions include memory mirror position adjustments, door lock-unlock and window up-down systems, which can be directly controlled by the driver and/or controlled by the passengers.

A master control panel is typically located near the driver to enable driver control of such functions throughout the vehicle. For example, the driver can control the windows, mirrors and door locks of the vehicle by activating switches or actuators of the master control panel. The passengers generally can control the functions that are associated with the passengers' positions. For example, a back seat passenger can generally control the window and door lock nearest the passenger if enabled by the driver to do so. Other functions are indirectly and directly controlled by the driver and/or the passengers. For instance, a "door ajar" signal might be displayed if a door is ajar. In addition, a courtesy light can be lit when a door is opened to enable entry and exit through the door.

Many of the foregoing functions, and other functions not specifically mentioned, utilize electronic devices including components and accessories of various types that are electrically interconnected with sensors, controls activators, indicators, a data bus and a power source. Presently, wire bundles containing numerous wires (e.g., sixteen wires) are routed within the chassis sheet metal and doors of the motor vehicle to provide such interconnections. For instance, in some vehicle platforms the window, lock, door ajar, lights and alarm switches, which are part of a rear door assembly, are wired from the rear door assembly to the front of the vehicle and into the body controller or front Driver/Passenger Door Module.

The routing of such wires is time consuming and labor intensive. Furthermore, the wires take up space and add mass to the vehicle. Moreover, in-line connectors are presently used to interconnect bundles of wires coming from one compartment to another, such as from the body sheet metal into a "door inner". The door inner has further in-takes that are connected to various devices such as actuators and loads. If such connectors are not seated properly, less than optimal connections exist.

In view of the foregoing, it should be appreciated that there is a need to provide improved methods and apparatuses for communicating control signals from actuators to loads or device mechanisms performing a variety of functions at various locations within an automotive vehicle. It is desired that such methods and apparatuses be simple in design and minimize the use of wires, connections, splices, connectors and other components. Reduction in the number of wires also desirably reduces the wire mass, the size of connectors, the insertion force, ergonomic issues and the size of grommets through which the wires run between two compartments in vehicles. It is further desired that such methods and apparatuses facilitate integration and commonality by enabling the reduction of the complexity and mass of present switches or actuators. Such mass savings in switches and wires result in improved fuel economy. Furthermore, other desirable features and characteristics of the present invention will become apparent from the subsequent detailed description, brief summary, abstract, and appended claims, taken in conjunction with the accompanying drawings and the foregoing technical field and background.

BRIEF SUMMARY

In accordance with an exemplary embodiment of the present invention, a wireless apparatus is provided for communicating messages for controlling the functioning of devices within a vehicle. The apparatus comprises a first module including a first wireless control node that is positioned at a first location within the vehicle. The apparatus also comprises a second module including a second wireless control node that is positioned at a second location within the vehicle. Selected devices are coupled to each of the first and second wireless control nodes. Each of the devices is adapted to perform a predetermined function in response to a predetermined message from the control node. The first and the second wireless control nodes are adapted to form a virtual wireless network so that the first wireless control node and the second wireless control node can communicate the messages to each other. The apparatus also has a third wireless control node positioned external to the vehicle. The third wireless node joins the virtual wireless network under certain conditions. This enables the third wireless control node to communicate messages to at least one of the first wireless control node and the second wireless control node to control the functioning of at least one of the devices.

In accordance with another exemplary embodiment of the present invention, a method is provided for communicating messages for controlling the functioning of devices within an automotive vehicle. Each of the devices is adapted to perform a predetermined function in response to a selected message from a wireless control node coupled thereto. Such method comprises the steps of placing a first wireless control node and a second wireless control node at different locations in a vehicle. The first and the second wireless control nodes are enabled to form a virtual network so that the first wireless control node and the second wireless control node can communicate the messages to each other to control the devices. A third wireless control node is positioned external to the vehicle and enabled to selectively become part of the virtual network so that the third wireless control node can communicate messages to at least one of the first wireless control node and the second wireless control node. At least one of the first wireless control node and the second wireless control node utilizes the messages to further control the functioning of at least one of the devices within the vehicle.

BRIEF DESCRIPTION OF THE DRAWINGS

The present invention will hereinafter be described in conjunction with the appended drawing figures, wherein like reference numbers denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
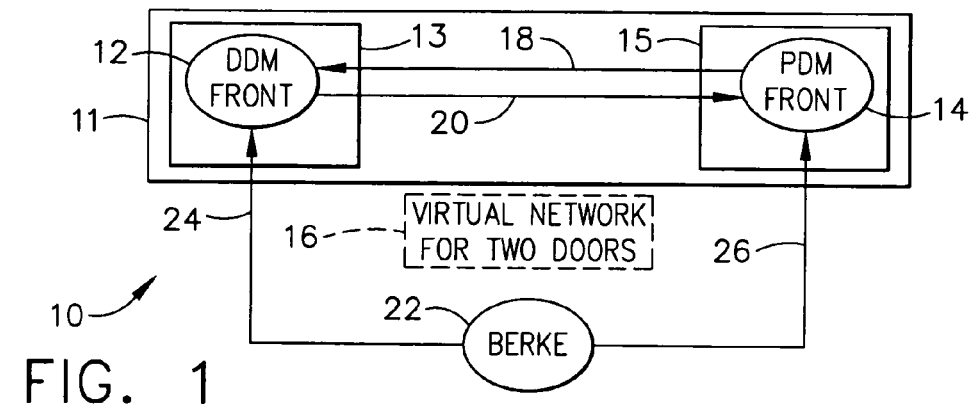
FIG. 1 is a diagrammatic view of a wireless apparatus for communicating messages to control the functioning of devices in a two door vehicle in accordance with an exemplary embodiment of the present invention.

Referring to FIG. 1, a diagrammatic view is shown of a wireless apparatus 10 (e.g., a Bluetooth wireless apparatus) that is suitable for communicating messages related to a vehicle indicated by block 11, which can be any number of vehicles such as an automobile, truck or sports utility vehicle, for instance. Any number of wireless standards or protocols can be used to implement system 10, including the well-known Bluetooth protocol. The messages can include information related to either vehicle device statuses or commands for operating vehicle devices. For instance, such messages enable control modules 12 and 14 that are respectively located in at least a driver door indicated by block 13 and a passenger door indicated by block 15 of the vehicle 11 in accordance with an exemplary embodiment of the present invention. Such modules are generally indicated in this detailed description by capitol letter abbreviations. More particularly, Driver Door Module (DDM) 12, which includes a wireless control node (e.g., a Bluetooth wireless control node), is located in driver door (DD) 13. Passenger Door Module 14 (PDM), which includes another wireless control node (e.g., another Bluetooth wireless control node), is located in passenger door (PD) 15. The wireless nodes of these modules 12 and 14 are adapted to form a wireless virtual network or Pico net 16 with each other so that modules 12 and 14 can communicate radio frequency messages to each other as indicated by lines 18 and 20. A third Enabled Keyless Entry (BERKE) module 22 (e.g., a third Bluetooth Enabled Keyless Entry (BERKE)) is positioned external to vehicle 11. BERKE 22 includes another wireless control node that is capable of sending wireless signals (e.g., Bluetooth wireless signals) that automatically enable BERKE 22 to join the virtual network 16 when BERKE 22 is in range of nodes 12 and 14. As a result, BERKE 22 can then communicate operator-initiated messages to node 12 and/or node 14. The communication of wireless messages from BERKE 22 to DDM 12 and PDM 14 are indicated by respective lines 24 and 26. Network 16 replaces wires, connections, splices, connectors and other components otherwise used in the to hard wire module 12 to module 14 thereby reducing the problems described in the background.

For purposes of explanation it is assumed that wireless control nodes 12, 14 and BERKE 22 form a virtual network 16 (e.g., Bluetooth virtual network), and the messages received by a master target node will be sent to all nodes of the network 16. However, a node will only act on messages pertinent to that particular node. The functions/status/features of system 10 are generally indicated in this detailed description by words having initial capitalization, which are compiled in tables such as the following Table 1. For example if DDM 12 performs as the master target node, an operator can utilize BERKE 22 to provide a wireless message directly to DDM 12 to "Unlock" only the driver door. Although PDM 14 also indirectly receives this message through network 16, PDM 14 will ignore the message because it is not pertinent thereto. The BERKE 22 can also directly provide either a "Lock" or "Unlock All" message to DDM 12 to respectively lock or unlock the driver door. The network 16 will also share these messages with PDM 14 to also respectively lock or unlock the passenger door. Thus, BERKE 22 provides a remote keyless entry function. Moreover a "Panic" message also can be sent by BERKE 22, which will be received by DDM 12 and shared by the network with PDM 14. A gateway can be included in PDM 14 that will channel the "Panic" message out of the network 16 to the appropriate vehicle system as will be subsequently described with respect to FIG. 4, to initiate a panic horn (not shown) sound cycle function, for instance.

The following Table 1 shows a Message Set (e.g., a Bluetooth Message Set) sent by BERKE 22. The first column indicates the origination point of a message (BERKE), the second column indicates the master target module (DDM) and the third column indicates the function or status being controlled.

TABLE 1

| MESSAGE SET OF BERKE 22 |
| --- |
| BERKE_DDM_Lock |
| BERKE_DDM_Unlock |

TABLE 1-continued

MESSAGE SET OF BERKE 22

BERKE_DDM_UnlockAll
BERKE_DDM_Panic

Figure 2:
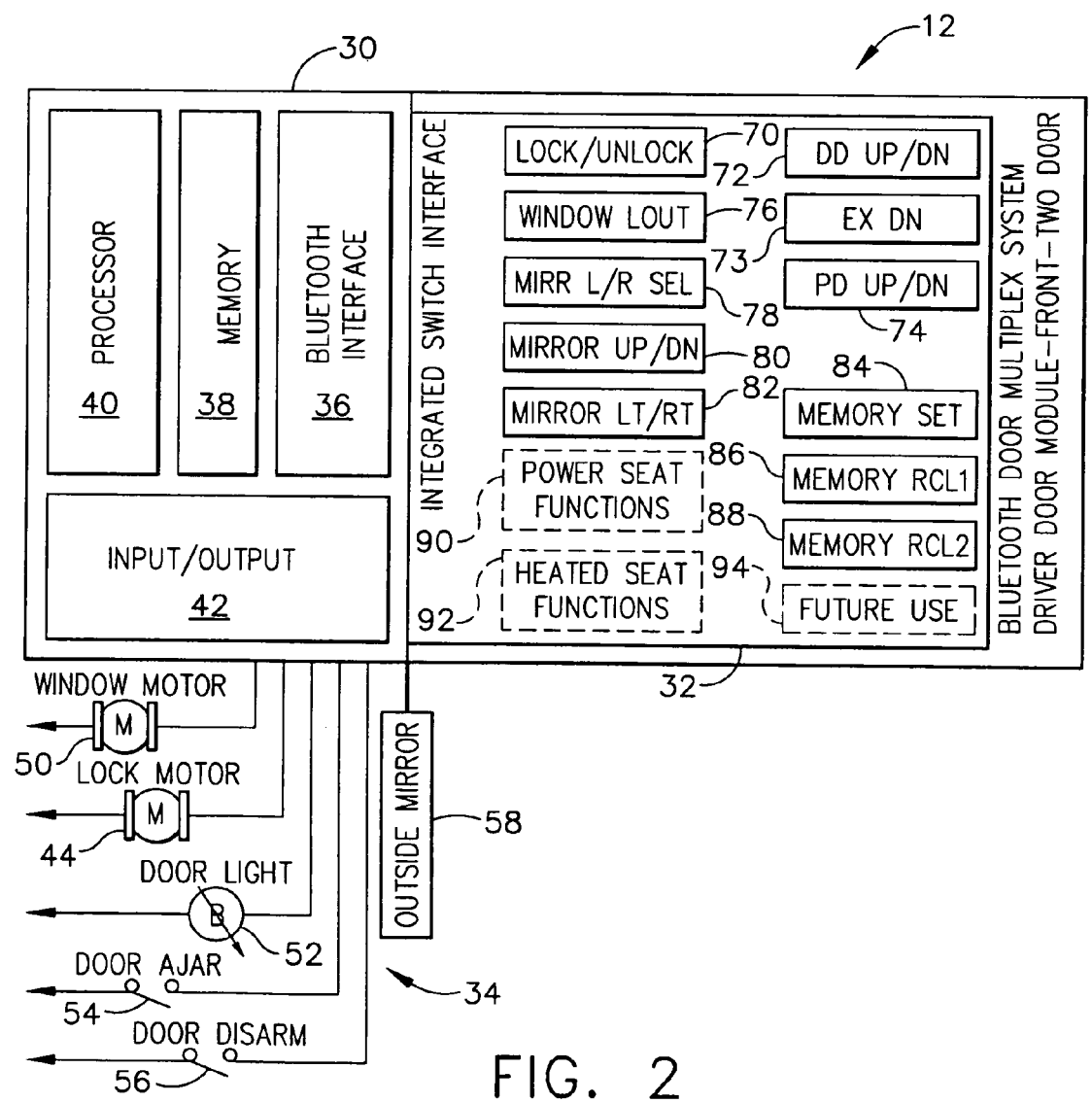
FIG. 2 is a block diagram of a module having a wireless control node associated with the driver door of a two door vehicle in accordance with an exemplary embodiment of the present invention.

DDM 12 and PDM 14 also work together to facilitate control of additional functions. FIG. 2 is a block diagram of a controlled DDM 12 (e.g., Bluetooth controlled DDM) having a wireless control node 30 and a plurality of switches or manual controllers included on a driver control panel 32. DDM 12 controls driver door devices generally indicated by reference number 34 associated with the driver door 13 in accordance with an exemplary embodiment of the present invention.

Wireless control node 30 of DDM 12 includes an interface 36 (a Bluetooth interface 36), which is capable of receiving message signals from other enabled nodes such, as the wireless node of PDM 14 or BERKE 22 of FIG. 1. Node 30 also includes a memory 38 and a processor 40 which are coupled by an input/output block 42 to control at least some of driver door devices 34 in response to messages, including commands received from the other wireless nodes such as BERKE 22 or from panel 32. Interface 36 is capable of transmitting and receiving message(s) that control the functionality and/or provide the status of certain vehicle door functions provided by devices 34, including any message(s) that come from the vehicle gateway shown in FIG. 4. Interface 36 includes a chip (e.g., a Bluetooth Chip) and other supporting components. The memory 38 stores device control software and acts as a buffer. Processor 40 can be any number of processors such as a RISC processor that meets automotive specifications such as temperature.

Devices 34 include a door lock motor 44, a window motor 50, a door light 52, a door ajar status switch (AjarSwitch) 54, a door alarm Disarm Switch 56 and a driver door outside Mirror 58. Door lock motor 44 Locks and Unlocks the driver door 13 either as previously described in response to the BERKE messages or in response to operation of button 70 of control panel 32. Window motor 50 rolls the driver door Window UP and Down (Dn) in response to the driver door Up/Dn button 72 being pressed. The Express Down (ExDn) button 73 causes motor 50 to roll the driver door window all the way down if the button 73 is operated causing a WindowDownExpress message to be sent to motor 50. Door light 52 lights the exit or entry when the driver door is opened to facilitate driver entry or departure from the vehicle. Door light 52 can also come on when the vehicle is unlocked using the BERKE 22. Mirror 58 includes two motors (not shown) for tilting mirror 58 UP, down (DN), left (Lf) or right (Rt) in response to operation of switches 78, 80 and 82 of panel 32. Mirror 58 also contains resistor logic (not shown) that enables module 12 to remember a mirror location in the form of data stored by pressing Memory Set switch 84. The mirror location data enables the mirror to be restored to the same position when the position is recalled in a session initiated by pressing Memory Rc11 or Memory Rc12 switches 86 or 88, respectively, for the driver door mirror 58 and passenger door mirror 130 of FIG. 3. The mirror position can also be recalled in a session initiated by pressing the unlock feature on a BERKE. BERKES can further be programmed to act as BERKE 1 and BERKE 2 synonymous with Driver 1 and Driver 2. The number of BERKES allowed will be dependent on vehicle architecture.

The switches of panel 32 are directly wired to input/output block 42 that is directly wired to devices 34. The driver door functions of devices 34 are controlled via software logic from the processor 40. Switches of panel 32 that operate devices 34 report their statuses to processor 40 via input/output 42. In addition, the switches communicate through wireless control node 30 and line 20 of virtual network 16 to control the passenger door device functions through the wireless control node 102 of PDM 14 of FIG. 3. More specifically, switch 70 of FIG. 2 directly controls motor 50 to provide the Lock/Unlock function for the driver's door 13 and switch 70 indirectly operates through the wireless node 30 and network line 20 to control the passenger door Lock/Unlock function through node 102. Switches 72, 74 and lock out switch 76 control the driver door and passenger door windows. Switch 76 provides a WindowLockout function for the passenger window operation. Window lockout (Lout) switch 76 allows the driver to disable the passenger control of the passenger door window. The driver operates mirror selection (MIRR L/R Sel) switch 78 to select whether the driver or passenger mirror. Switch 80 controls the UP/DN mirror tilt and switch 82 controls the left (Lt) and right (Rt) mirror tilt. Other functions such as Power Seat Functions 90, Heated Seat Functions 92 and others 94 can be added to panel 32.

The following Table 2 shows the Message Set (e.g., Bluetooth Message Set) for the DDM 12. For instance, the DDM_DDM_WindowLockout message is for disabling the passenger door window up and down functions. The DDM_DDM_Light message will be sent to turn door light 52 on. The door disarm switch 56 provides a DDM_DDM_DisarmSwitch message when the door is locked or unlocked with a key programmed for the vehicle. The DDM_DDM_MemoryRecall message initiates a memory recall session, which can include recalling the positions of outside mirrors, seat positions, radio station, pedal position, etc. The DDM_DDM_MemorySetStart message is for respectively starting a memory set session for outside mirrors, seat positions, radio station, pedal position etc. The DDM_DDM_MemorySet1 and DDM_DDM_MemorySet2 messages are for either setting or recalling the memory locations respectively for devices supported to have memory recall in FIG. 2 and FIG. 3.

The first column of the message set of Table 2 indicates the origination point of a message (DDM), the second column indicates the module being controlled (DDM or PDM) and the last column indicates the feature/function/status being controlled. The DDM_DDM messages are directly sent on wires from the control panel 32 to the devices 34. The DDM_PDM messages are sent from module 12 to module 14 via wireless network 16.

TABLE 2

MESSAGE SET FOR DDM 12

| | |
|---|---|
| DDM_DDM_Lock | DDM_DDM_MirrorRight |
| DDM_DDM_Unlock | DDM_DDM_MemoryRecall |
| DDM_DDM_UnlockAll | DDM_PDM_MirrorUp |
| DDM_DDM_WindowUp | DDM_PDM_MirrorDown |
| DDM_DDM_WindowDown | DDM_PDM_MirrorLeft |
| DDM_DDM_WindowDownExpress | DDM_PDM_MirrorRight |
| DDM_PDM_WindowUp | DDM_DDM_MemorySetStart |
| DDM_PDM_WindowDown | DDM_DDM_MemorySet1 |
| DDM_DDM_WindowLockout | DDM_DDM_MemorySet2 |
| DDM_DDM_MirrorSelect | DDM_DDM_AjarSwitch |
| DDM_DDM_MirrorUp | DDM_DDM_DisarmSwitch |
| DDM_DDM_MirrorDown | DDM_DDM_Light |
| DDM_DDM_MirrorLeft | |

Figure 3:
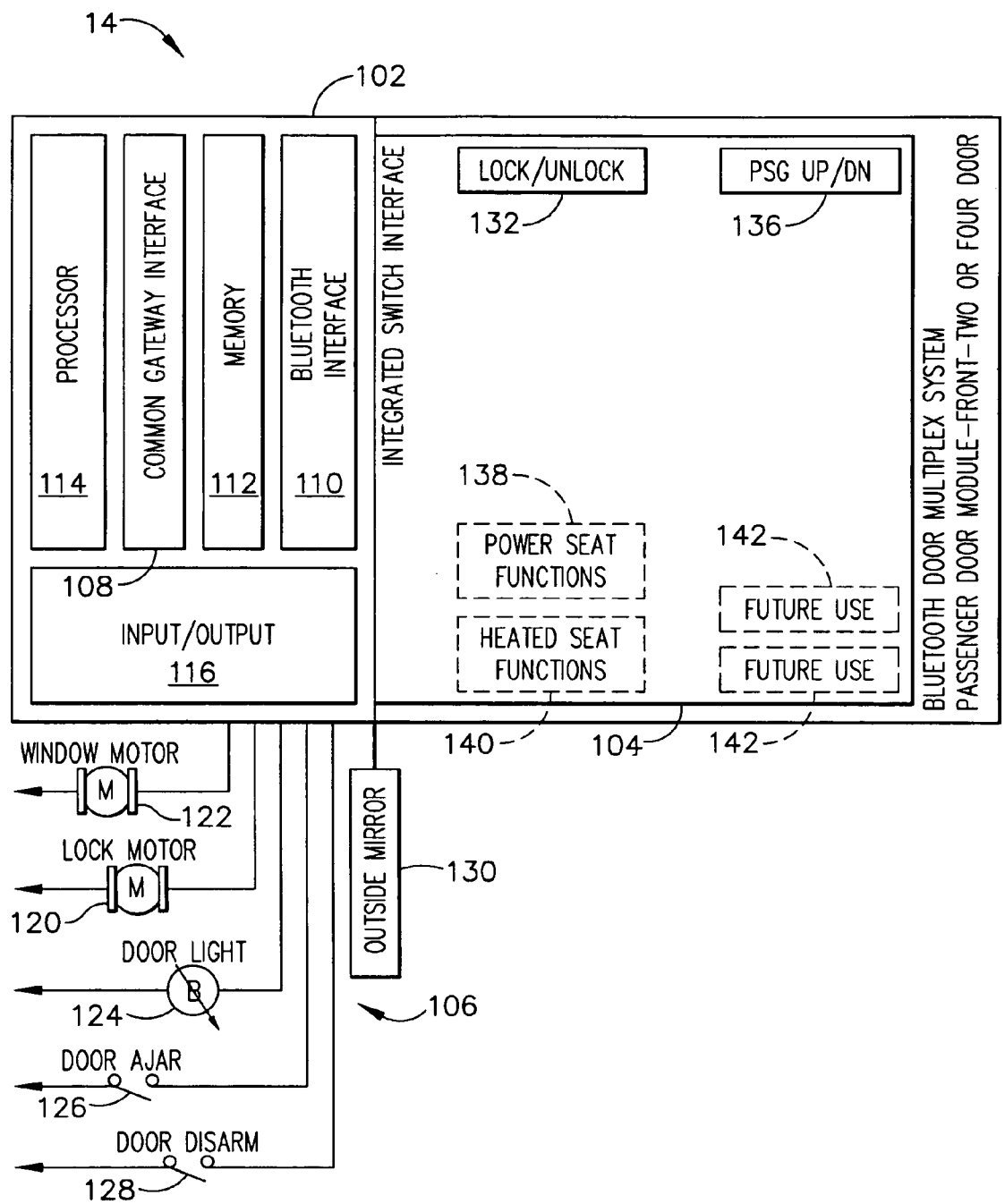
FIG. 3 is a block diagram of another module having another wireless control node associated with the passenger doors of two door and four door vehicles in accordance with an exemplary embodiment of the present invention.

FIG. 3 is a block diagram of a control PDM module 14 (e.g., a Bluetooth control PDM module) that is similar in many respects to DDM module 12 of FIG. 2. More specifically, module 14 has a wireless node 102 and switches or manual controllers included in a control panel 104. Module 14 also controls a plurality of passenger door devices generally indicated by reference number 106 associated with the passenger door of a two door (or four door) vehicle in accordance with an exemplary embodiment of the present invention.

Figure 4:
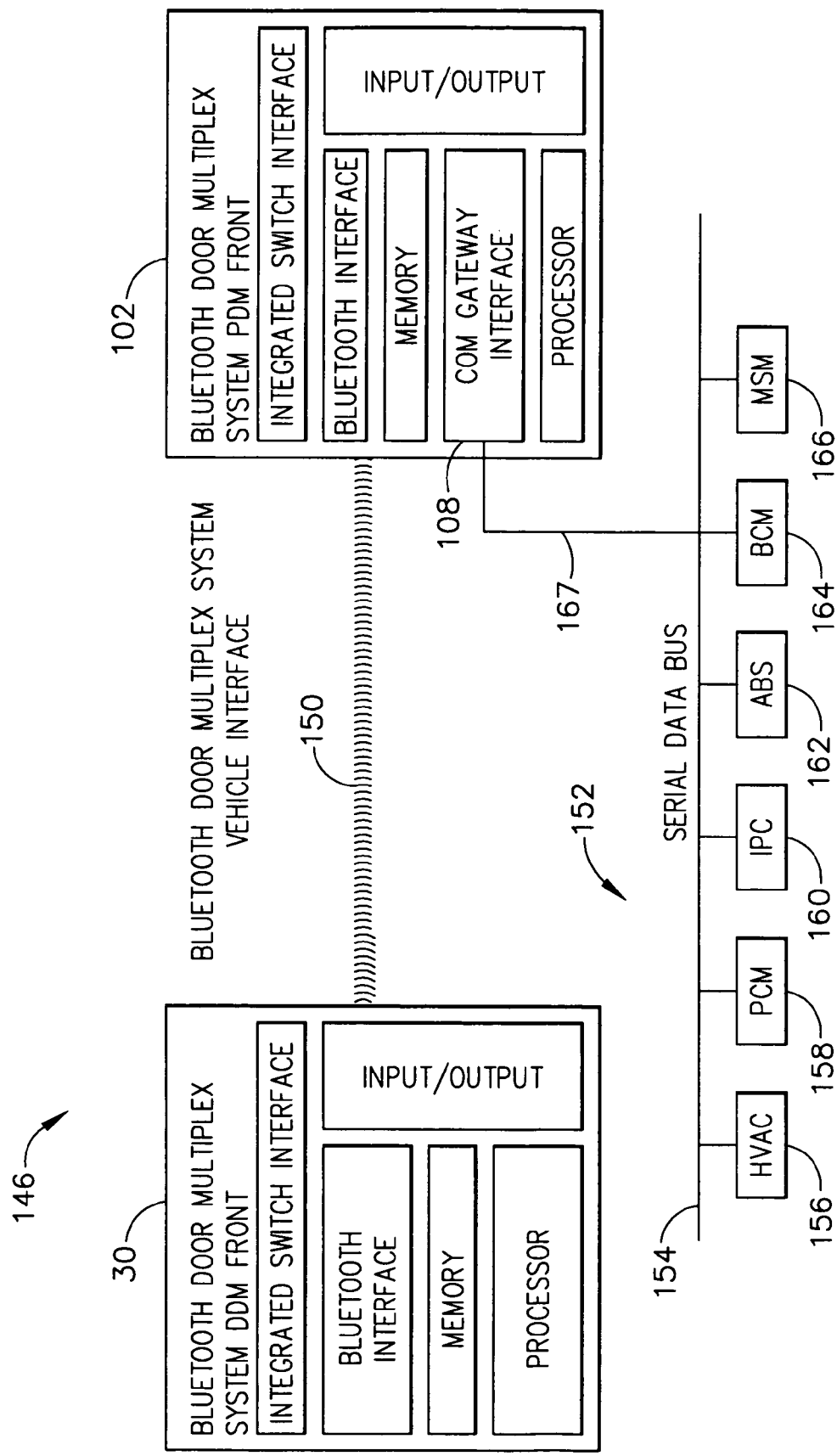
FIG. 4 is a block diagram showing the integration of a vehicle serial data bus with the wireless control nodes of FIGS. 2 and 3 in accordance with an exemplary embodiment of the present invention.

Wireless control node 102 includes a Common Gateway Interface 108, which is described in more detail with respect to FIG. 4. Wireless node 102 further includes an interface 110 (e.g., a Bluetooth interface) which is capable of transmitting signals to and receiving signals from other enabled nodes such as the wireless node 30 of module 12 of FIG. 2 or BERKE 22 of FIG. 1. Wireless control node 102 also includes a memory 112 and a processor 114, which are coupled through input/output block 116 to control at least some of passenger door devices 106 in response to messages received from other wireless nodes or from panel 104. For instance, devices 106 include a passenger door lock motor 120 that can Lock or Unlock the passenger door 15 in response to selected messages to "PDM" of Table 1 initiated by BERKE 22 or messages to "PDM" from panel 32 shown in Table 2 or messages from panel 104 shown in the following Table 3.

Passenger door devices 106 also include a window motor 122, door light (Light) 124, a door ajar switch 126, a Door Disarm switch 128 and a passenger door outside mirror 130. Window motor 122 rolls the passenger door window UP and Down (DN) at a normal speed. The door light 124 lights the exit or entry when the passenger door is opened for passenger entry or departure from the vehicle. The door ajar switch 126 provides a PDM_PDM_AjarSwitch message when the passenger door is not fully closed. The door disarm switch 128 provides a PDM_PDM_DisarmSwitch message for disarming an alarm when the door is locked or unlocked with a key programmed for the vehicle 11. Mirror 130 includes motors for tilting UP, down (DN), and left (LF) or right (RT) in response to PDM_Mirror control messages from DDM 12 of Table 2. Other functions such as Power Seat Functions 138, Heated Seat Functions 140 and others 142 can be added to panel 104. The switches of panel 104 are integrated into module 14 to control devices 106 for the passenger door 15. More specifically switch 132 operates through processor 114 and input/output block 116 to control motor 120 to provide a passenger door Lock/Unlock function for passenger door 15. Switches 74 and 76 of FIG. 2 and switch 136 of FIG. 3 enable control of the passenger door window.

The following Table 3 shows the Message Set for PDM 14. The first column of Table 3 indicates the origination point of a message (PDM), the second column indicates the module being controlled (PDM) and the last column indicates the feature/function/status being controlled.

TABLE 3

MESSAGE SET FOR PDM 14

PDM_PDM_Lock
PDM_PDM_Unlock
PDM_PDM_WindowUp
PDM_PDM_WindowDown
PDM_PDM_AjarSwitch
PDM_PDM_DisarmSwitch
PDM_PDM_Light FIG. 4 shows a multiplex system or apparatus 146 including previously described wireless control modules 30 and 102 which send messages to each other along communication link 150 (e.g., a Bluetooth communication link), which includes lines 18 and 20 of virtual network 16 of FIG. 1. Common Gateway Interface 108 acts as a gateway between another vehicle communication network 152, which can use a known standard or protocol different from the Bluetooth standard of network 16. Serial data bus 154 interconnects the Heating Ventilation Air Conditioning (HVAC) 156, Powertrain Control Module (PCM) 158, Instrument Panel Cluster (IPC) 160, Anti-lock Braking System (ABS) 162, Body Control Module (BCM) 164, Memory Seat Module (MSM) 166 etc. systems of vehicle 11. Common Gateway Interface 108 translates messages from one standard to another standard and communicates translated messages along conductor 167 from one of the foregoing networks to the other network in a known manner. For instance, messages from BCM 164 are translated into a format (e.g., a Bluetooth format) by gateway 108 and sent by wireless node 106 to wireless node 30 for instance. Utilization of additional network 152 simplifies the requirements of network 16.

Figure 5:
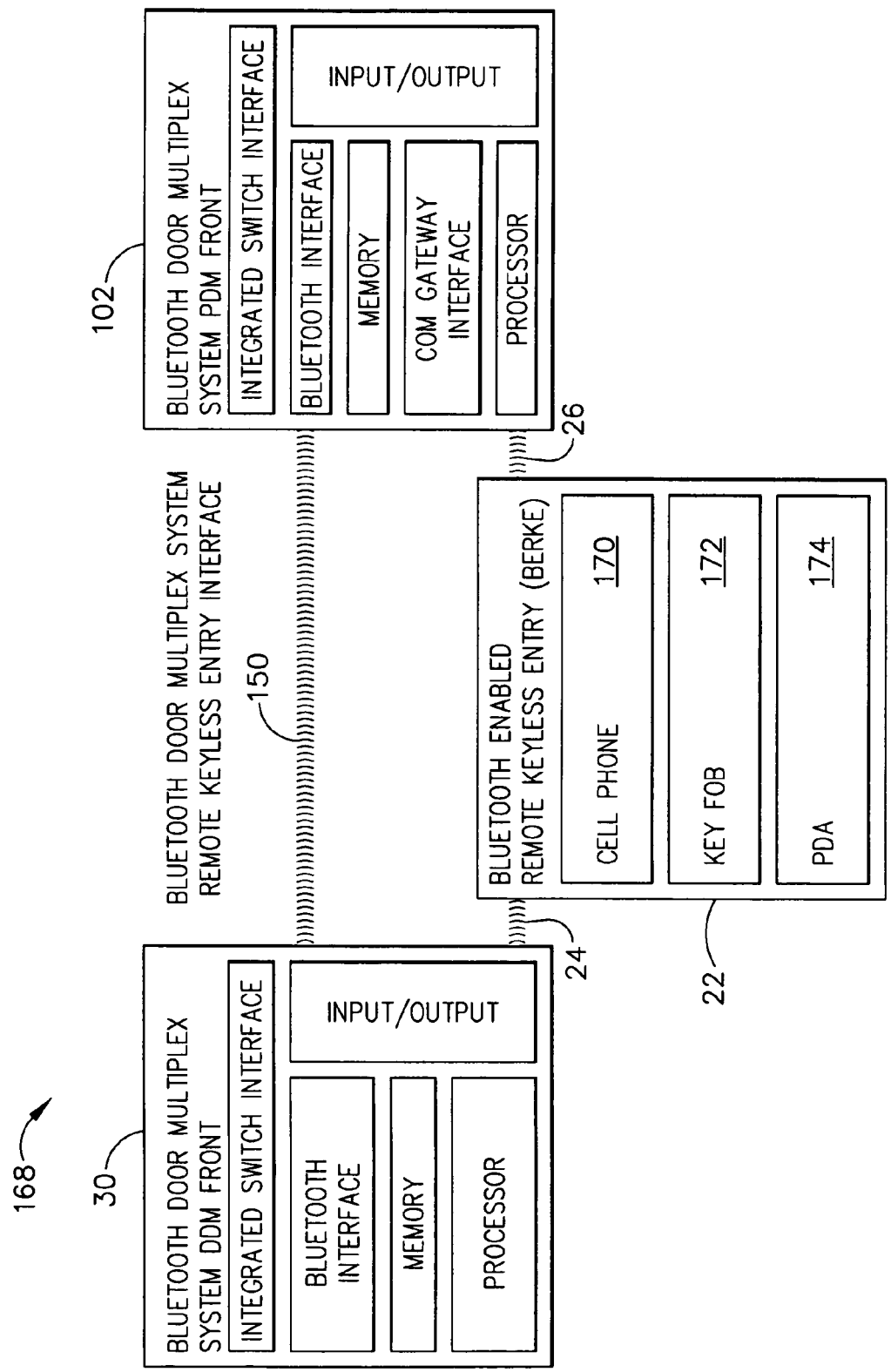
FIG. 5 is a block diagram showing alternative embodiments of remote keyless entry wireless systems for a two door vehicle in accordance with exemplary embodiments of the present invention.

FIG. 5 is a block diagram of system 168 including DDM node 30, PDM node 102 and BERKE node 22 for the two-door vehicle 11 in accordance with exemplary embodiments of the present invention. As shown in FIG. 5, the function of BERKE 22 can be implemented in any of a number of alternative hand held devices such as cell phone 170, key fob 172 or Personal Digital Assistant (PDA) 174.

Figure 6:
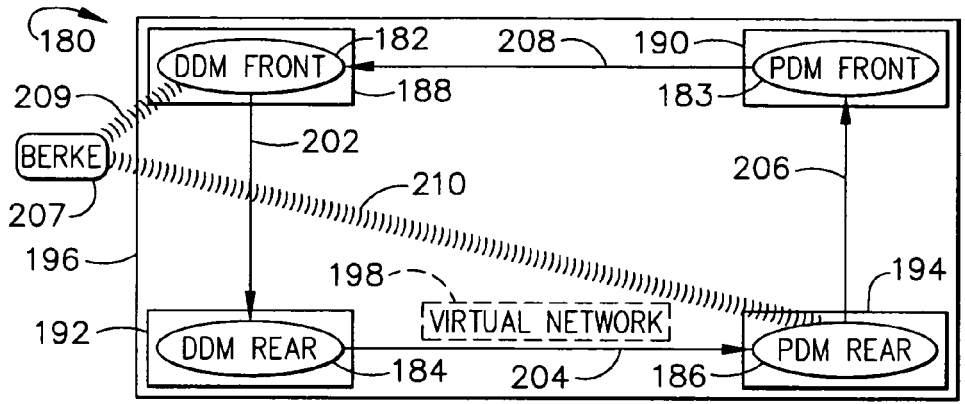
FIG. 6 is a diagrammatic view of a wireless apparatus for communicating messages for controlling the functioning of devices in a four door vehicle in accordance with an exemplary embodiment of the present invention.

Referring to FIG. 6, a diagrammatic view is shown of a wireless apparatus 180 (e.g., a Bluetooth wireless apparatus) for communicating messages that can include information related to either device statuses or commands for operating the devices of a four door vehicle. Apparatus 180 includes a front driver door module (DDM Front) 182, a front passenger door module (PDM Front) 183, a rear driver door module (DDM Rear) 184 and a rear passenger door module (PDM Rear) 186. These modules are respectively located in a front driver door 88, a front passenger door 190, a rear driver door 192 and a rear passenger door of a four door vehicle 196 in accordance with an exemplary embodiment of the present invention. Each of these modules includes a wireless control node (e.g., a Bluetooth wireless control node). The wireless nodes are adapted to form a wireless virtual network or Pico net 198 with each other so that modules 182, 183, 184 and 186 can communicate radio frequency messages to each other as indicated by lines 200, 202, 204 and 206. A BERKE 207 is positioned external to vehicle 196. BERKE 207 has a control module that includes another wireless node that is capable of sending wireless signals that enables BERKE 207 to become part of virtual network 198 when BERKE 207 is in range of either module 182 or 186. Respective lines 209 and 210 indicate the communication of wireless messages from BERKE 207 to DDM Front 182 and PDM Rear 186. The message set of BERKE 207 is the same as defined for BERKE 22 of vehicle 11 as listed in Table 1. The operation of the system 180 is similar to the operation already described for system 10. Network 198 replaces wires, connections, splices, connectors and other components otherwise required to connect module 182 to modules 183, 184, and 186, thereby reducing the problems described in the background portion of this specification to a greater extent than for the two door embodiment of FIG. 1. Network 198 can reduce the number of wires from rear modules 184 and 186 to module 182. For example, the number of wires in a bundle can be reduced from sixteen to two wires per bundle.

Figure 7:
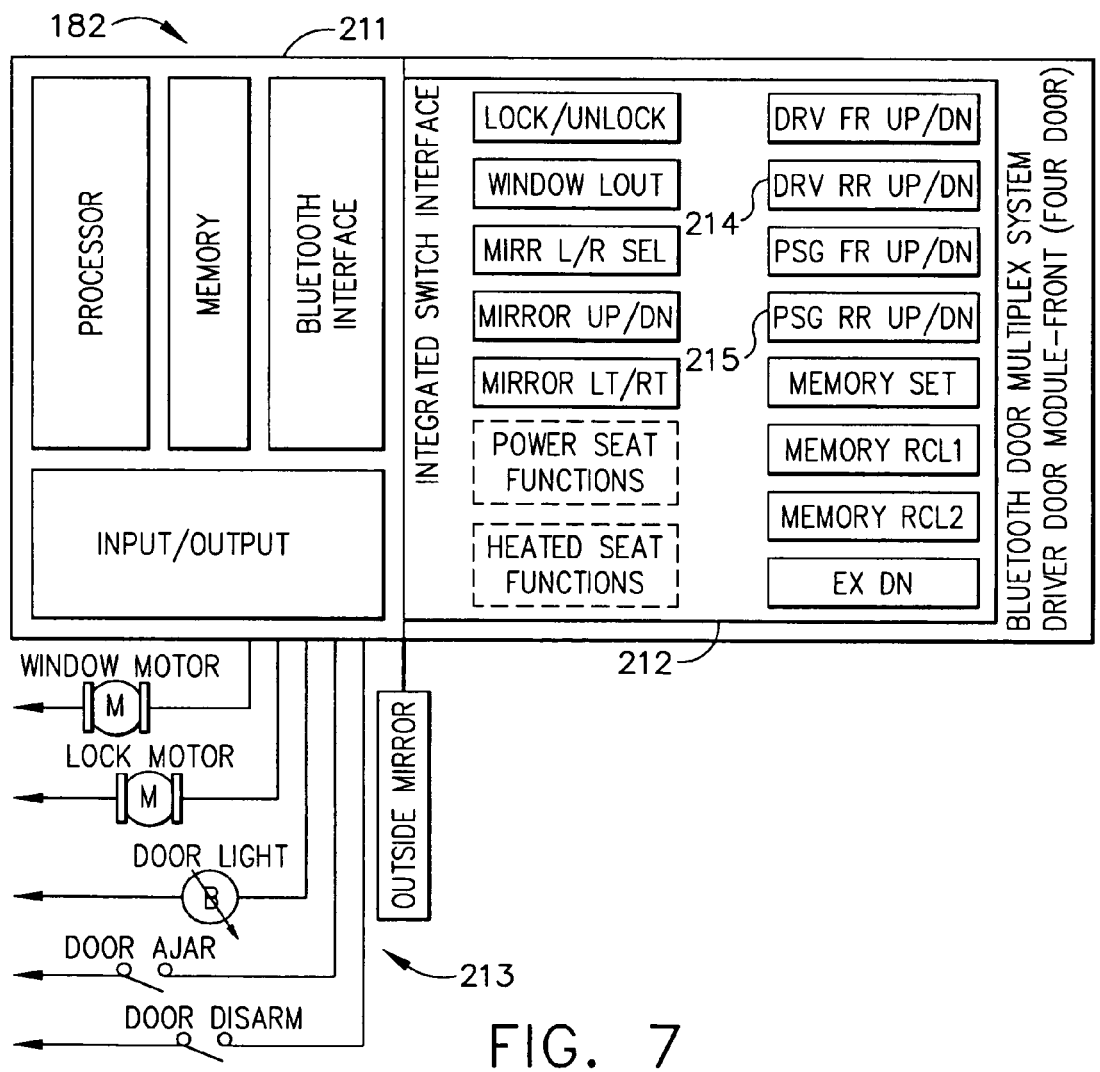
FIG. 7 is a block diagram of a module having a wireless control node associated with the front driver door of a four door vehicle in accordance with an exemplary embodiment of the present invention.

FIG. 7 is a block diagram of a controlled DDM Front module 182 (e.g., a Bluetooth controlled DDM Front module) having a wireless control node 211 and a plurality of switches or manual controllers included on a control panel 212. Wireless control node 211 is generally similar to node 30 of FIG. 2. For instance DDM 182 controls a plurality of driver door devices generally indicated by reference number 213 that are associated with the front driver door 188 of FIG. 6 in accordance with an exemplary embodiment of the present invention. Driver door devices 213 are the same as devices 34 of FIG. 2. Control panel 212 is generally the same as panel 32 of FIG. 2 except that panel 212 includes driver rear up down (Dr Rr Up/Dn) switch 214 and a passenger rear up down (Psg Rr Up/Dn) window switch 215.

The following Table 4 shows the Message Set (e.g., a Bluetooth Message Set) for DDM Front module 182. The first column of Table 4 again indicates the origination point of a message DDM Front (DDM), the second column indicates the module being controlled (DDM, PDM, RDDM and RPDM) and the last column indicates the feature/function/status being controlled. In the second column, PDM is PDM Front and RDDM is DDM Rear and RPDM is PDM Rear. The DDM_DDM messages are directly sent to node 211 in response to activation of the switches on the control panel 212 to control the functioning of devices 213.

TABLE 4

MESSAGE SET FOR DDM Front 182

| | |
|---|---|
| DDM_DDM_Unlock | DDM_DDM_MirrorLeft |
| DDM_DDM_UnlockAll | DDM_DDM_MirrorRight |
| DDM_DDM_WindowUp | DDM_DDM_MemoryRecall |
| DDM_DDM_WindowDown | DDM_PDM_MirrorUp |
| DDM_DDM_WindowDownExpress | DDM_PDM_MirrorDown |
| DDM_RDDM_WindowUp | DDM_PDM_MirrorLeft |
| DDM_RDDM_WindowDown | DDM_PDM_MirrorRight |
| DDM_PDM_WindowUp | DDM_DDM_MemorySetStart |
| DDM_PDM_WindowDown | DDM_DDM_MemorySet1 |
| DDM_RPDM_WindowUp | DDM_DDM_MemorySet2 |
| DDM_RPDM_WindowDown | DDM_DDM_AjarSwitch |
| DDM_DDM_WindowLockout | DDM_DDM_DisarmSwitch |
| DDM_DDM_MirrorSelect | DDM_DDM_Light |
| DDM_DDM_MirrorUp | |
| DDM_DDM_MirrorDown | |

Figure 8:
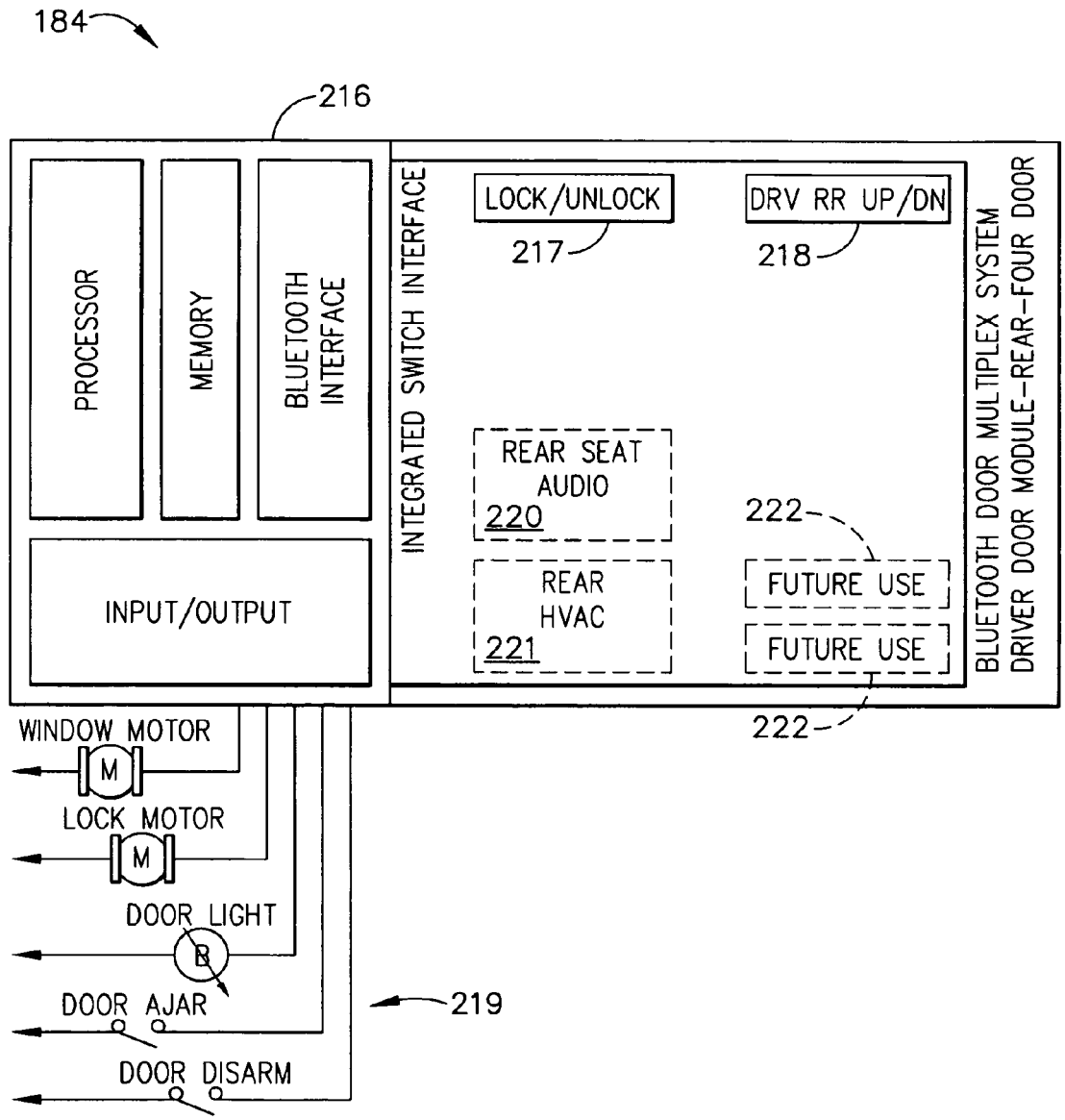
FIG. 8 is a block diagram of a module having a wireless control node associated with the rear driver door of a four door vehicle in accordance with an exemplary embodiment of the present invention.

PDM Front module 183 of FIG. 6 is the same as PDM module 14 of FIG. 3. PDM Front 183 also has the message set shown in Table 3. DDM Rear module 184 as shown in FIG. 8 is also generally the same as already 15 described module 14 of FIG. 3 except the wireless control node 216 of DDM Rear 184 does not include Common Gateway Interface 108. In addition, the door Lock/Unlock button 217 and window control button 218 of DDM Rear module 184 control functions in the rear driver's side door 192 of FIG. 6. Devices 219 of module 184 are the same as devices 106 of FIG. 3. DDM Rear 20 module 184 can include other functions such as Rear Seat Audio 220 and Rear Heating, Ventilation and Air Conditioning (HVAC) 221 along with switches 222 for controlling the functioning of other future devices.

The following Table 5 shows the Message Set (e.g., a Bluetooth Message Set) for DDM Rear 184 (RDDM). The first column of Table 5 indicates the origination point of a message (RDDM), the second column indicates the module being controlled (RDDM) and the last column indicates the feature/function/status being controlled.

TABLE 5

MESSAGE SET FOR Front DDM Rear 184

Figure 9:
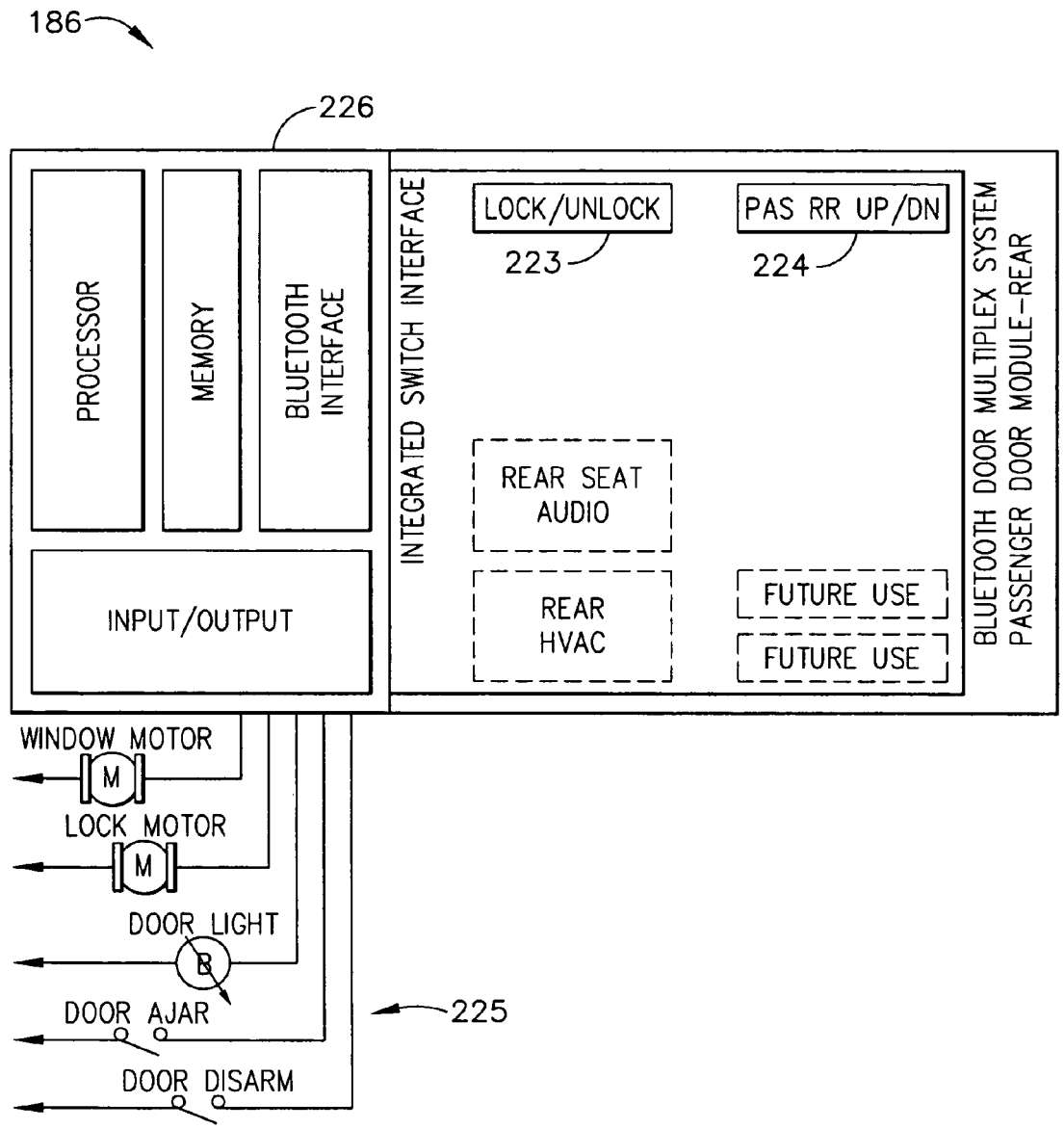
FIG. 9 is a block diagram of a module having a wireless control node associated with the rear passenger door of a four door vehicle in accordance with an exemplary embodiment of the present invention.

RDDM_RDDM_Lock
RDDM_RDDM_Unlock
RDDM_RDDM_WindowUp
RDDM_RDDM_WindowDown
RDDM_RDDM_AjarSwitch
RDDM_RDDM_DisarmSwitch
RDDM_RDDM_Light PDM Rear module 186 (RPDM) as shown in FIG. 9 is generally the same as already described for module 184 of FIG. 8 except the door Lock/Unlock button 223 and window control button 224 of PDM Rear 186 control functions in the passenger side rear door 194. Devices 219 and 225 are the same for modules 184 and 186 of respective FIGS. 8 and 9. Also, wireless control node 226 of FIG. 9 is the same as wireless control node 216 of FIG. 8.

The following Table 6 shows the Message Set (e.g., a Bluetooth Message Set) for PDM Rear module 186. The first column of Table 6 indicates the origination point PDM Rear module (RPDM) of the messages, the second column indicates the module being controlled (RPDM) and the last column indicates the feature/function/status being controlled.

TABLE 6

MESSAGE SET FOR PDM Rear 186

Figure 10:
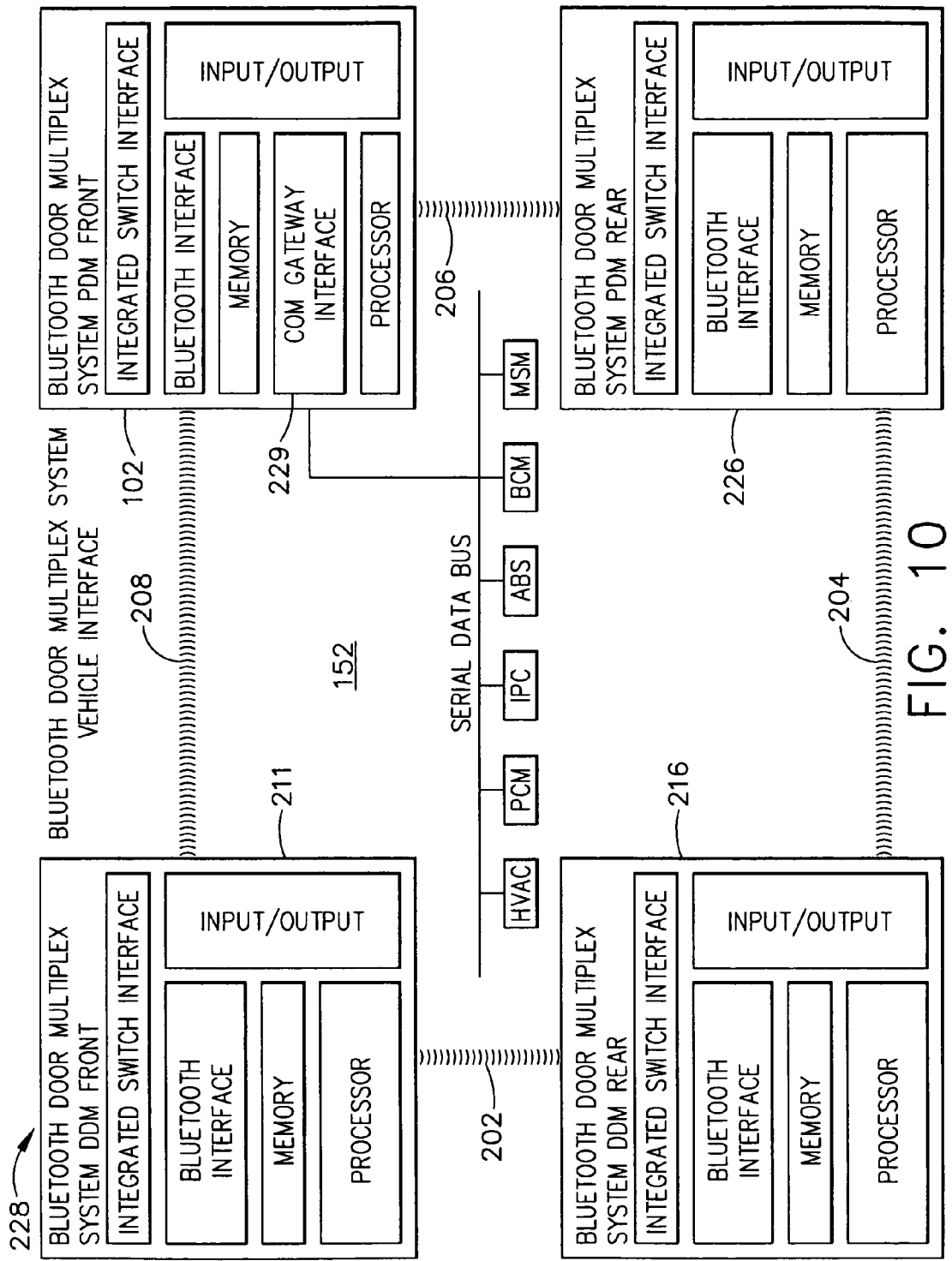
FIG. 10 is a block diagram showing the integration of a vehicle serial data bus with the wireless control nodes of a four door vehicle in accordance with an exemplary embodiment of the present invention.

RPDM_RPDM_Lock
RPDM_RPDM_Unlock
RPDM_RPDM_WindowUp
RPDM_RPDM_WindowDown
RPDM_RPDM_AjarSwitch
RPDM_RPDM_DisarmSwitch
RPDM_RPDM_Light FIG. 10 shows a multiplex system or apparatus 228 for the four-door vehicle 196 of FIG. 6. System 228 is similar to the already described system 146 FIG. 4 with the addition of wireless control nodes 216 and 226 for the rear doors and the substitution of node 211 for node 30. System 228 has a common gateway interface 229 for enabling network 152 and nodes 211, 102, 216 and 226 to communicate with each other through wireless links 202, 204 and 206. Links 202, 204, 206 and 208 respectively couple nodes 211 and 216, 216 and 226, 226 and 102, and 102 and 211.

Figure 11:
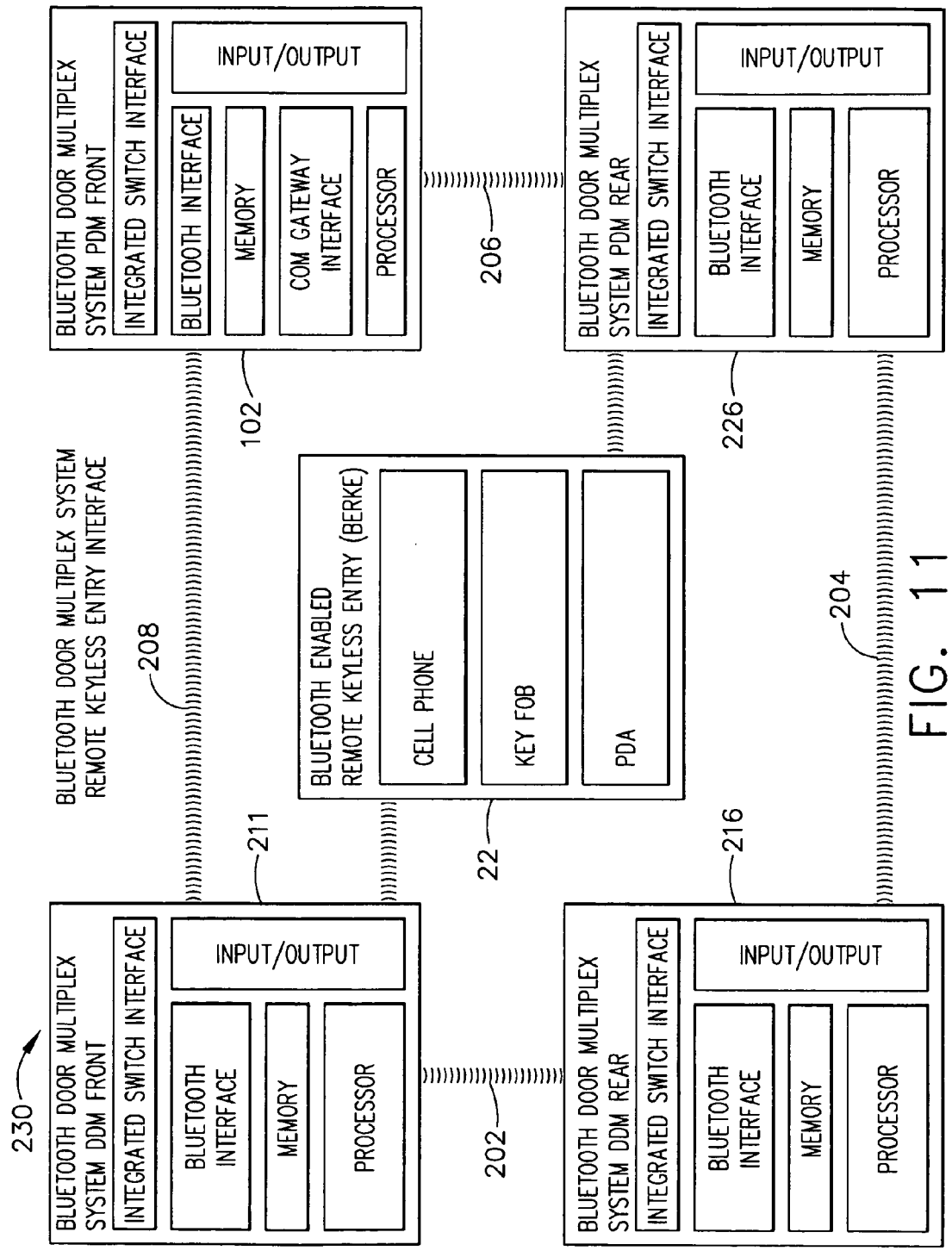
FIG. 11 is a block diagram showing an alternative to the enabled remote keyless entry wireless systems for a four door vehicle in accordance with exemplary embodiments of the present invention.

FIG. 11 shows a system 230 for the four-door vehicle 196, which is similar to already described system 180 of FIG. 6, except that BERKE 22 of FIG. 5 is substituted for BERKE 207. FIG. 11 shows the interconnection of wireless nodes 211, 102, 216 and 226 of respective modules 182, 183, 184 and 186 of FIG. 6 with BERKE 22. In FIG. 11, BERKE 22 communicates with nodes 211 and/or 226 either of which can perform as a master target node. This enables BERKE 22 to communicate with equal effectiveness from either side of four door vehicle 196.

Figure 12:
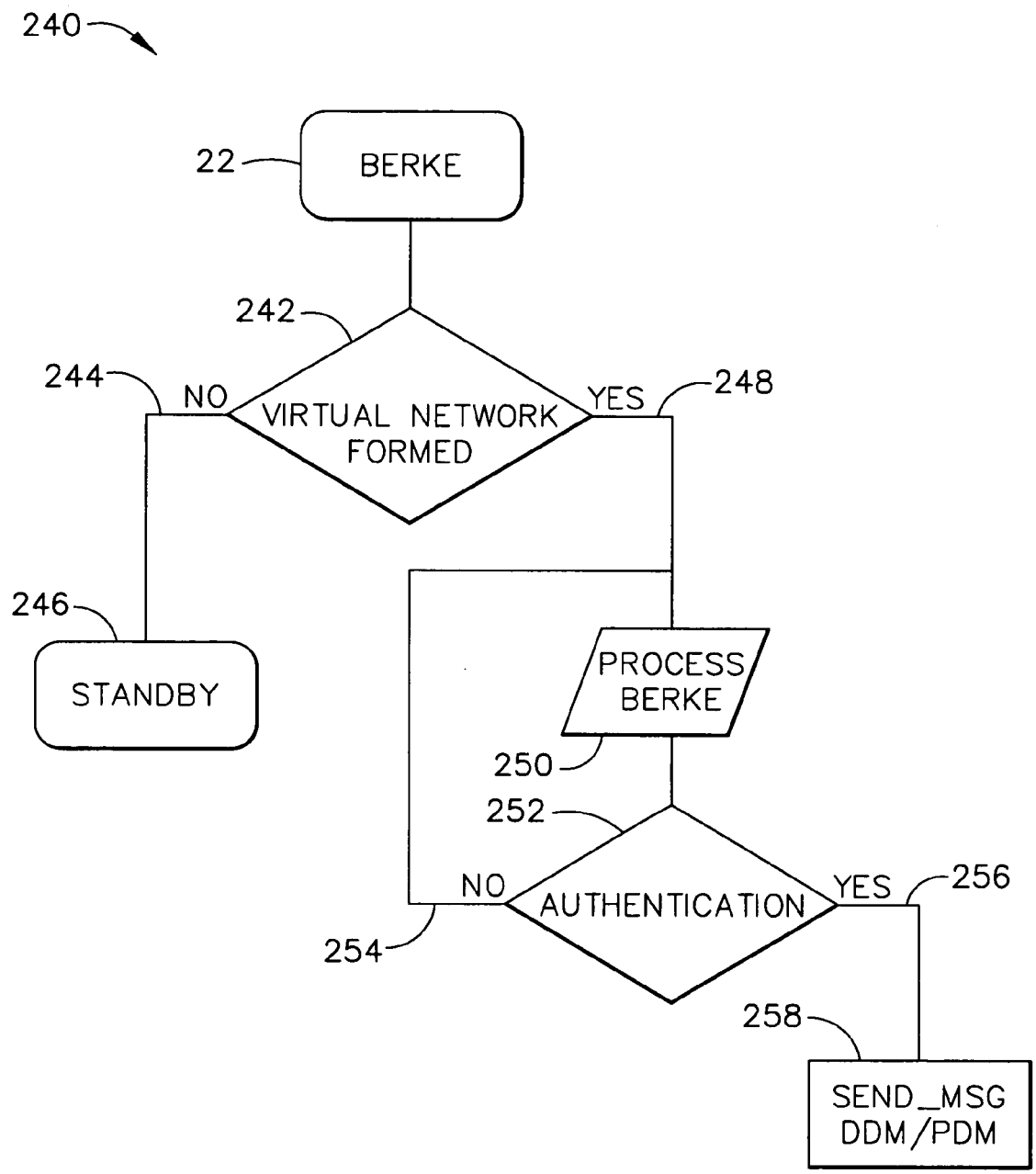
FIG. 12 is a flow chart of a logic diagram of a method implemented by the apparatuses of FIG. 1 and FIG. 6 to authenticate the enabled remote keyless entry of FIGS. 5 and 11 in accordance with exemplary embodiments of the present invention.

FIG. 12 shows a logic circuit diagram or software method flow chart 240 for verifying that a virtual network such as network 198 is formed and that a message from a BERKE is authentic. BERKE 22 for instance provides a handshake signal, which causes decision block 242 to query network 198. If the virtual network 198 has not been formed, then block 242 provides the "No" 244 and system 240 is placed in a Standby mode as indicated by status block 246. Alternatively, if the virtual network 198 is formed, then block 242 provides the "Yes" 248. Function block 250 then processes the BERKE signal and applies a signal derived there from to decision block 252 where it is compared with a preprogrammed code to determine whether the BERKE signal is authentic. If the BERKE is not authenticated, then the "No" 254 is provided and the process is repeated through blocks 250 and 252. If the BERKE is authenticated, the "YES" 256 enables a message of Table 1, for instance, to be sent to at least one of the target nodes of DDM 182 and PDM 186 of FIG. 6. The target node then decodes a command, which is provided to control the functioning of one or more of the devices 213, 219, 106 and/or 225 in response to the BERKE message.

In view of the foregoing, it should be appreciated that there has been provided improved wireless methods and apparatuses for providing multiplex wireless communication of the control signals or messages, such as the messages of Tables 1 through 6. Such messages can originate from BERKES 22 and 207 and actuators or switches such as 32, 104, and 212, which can be implemented by using membrane switch technology. These messages are provided to loads or device mechanisms 34, 106, 213, 219 and 224 to initiate or command the performance of a variety of functions at various locations such as in the two or four doors of automotive vehicles 11 and 196. Such methods and apparatuses are simple in design and minimize the use of wires, physical connections, splices, connectors and other components. The resulting reduction in the number of wires also desirably reduces ergonomic problems, the wire mass and the size of connectors, insertion force and grommet size through which the wires run. Such wireless apparatus facilitates integration and commonality by enabling the reduction of the complexity and the mass of present switches by enabling the use of membrane switches for actuators such as 32, 104, and 212. Such mass savings in switches and wires result in improved vehicle fuel economy.

While the exemplary embodiments have been presented in the foregoing detailed description, it should be appreciated that a vast number of variations exist. It should also be appreciated that these exemplary embodiments are only examples, and are not intended to limit the scope, applicability or configuration of the invention in any way. Rather, the foregoing detailed description provides those skilled in the art with a convenient road map for implementing an exemplary embodiment of the invention. It being understood that various changes may be made in the function and arrangement of elements described in any exemplary embodiment without departing from the spirit and scope of the invention as set forth in the appended claims.

The invention claimed is:

1. An apparatus for communicating messages to control the functioning of devices within a vehicle, comprising:
 a first module positioned at a first location within the vehicle, said first module including a first wireless control node coupled to a first plurality of said devices that are adapted to perform a predetermined function in response to a selected message from said first wireless control node;
 a second module positioned at a second location within the vehicle, said second module including a second wireless control node coupled to a second plurality of said devices that are adapted to perform a predetermined function in response to a selected message from said second wireless control node;
 a virtual network formed of said first wireless control node and said second wireless control node, said virtual network enabling said first wireless control node and said second wireless control node to communicate with each other and to actuate said first plurality of said devices and said second plurality of said devices, respectively; and
 a third wireless control node positioned external to the vehicle and capable of becoming part of said virtual network so that said third wireless control node can communicate messages to at least one of said first wireless control node and said second wireless control node, said at least one of said first wireless control node and said second wireless control node utilizing such messages to further control the functioning of at least one of the devices within the vehicle, wherein:
 the vehicle includes at least a driver door and a passenger door,
 said first location being associated with said driver door,
 said second location being associated with said passenger door,
 said first module and said second module further including at least one manual controller coupled to the devices of said door associated with each of said first module and said second module,
 each manual controller configured to provide messages to control at least a selected one of said associated devices in response to an operator actuating one of said manual controllers,
 said first module further including a first manual controller coupled to said first wireless control node and configured to provide messages to said first wireless control node in response to the actuation of said first manual controller by the operator, and
 said messages from said first manual controller being sent by said first wireless control node to at least one other wireless node to control a device coupled to said other wireless node in response to said actuation of said first manual controller.

2. The apparatus of claim 1 wherein said first wireless control node and said second wireless control node communicate with each other in accordance with a Bluetooth wireless standard.

3. The apparatus of claim 1 wherein said vehicle further includes:
 a plurality of other systems performing a different function relating to the operation of devices of the vehicle;
 a data bus for communicating with each of said other systems; and
 a gateway for communicating between said data bus and at least one of said first wireless control node and said second wireless control node.

4. The apparatus of claim 1 wherein:
 each of said doors having a door lock associated therewith; and
 said devices associated with each of the doors includes a door lock motor that is mechanically coupled to each of said door locks and said door lock motor being adapted to perform the functions of locking and unlocking said door lock coupled thereto in response to a set of messages from said third wireless control node.

5. The apparatus of claim 4 wherein said third wireless control node is a key fob.

6. The apparatus of claim 1 wherein:
 each of said doors having a window and a mirror;
 said devices associated with each of the doors also including a window motor and a mirror motor for respectively operating said window and said mirror;
 said window motor being adapted to perform the function of moving said window in response to a set of said messages from said first wireless control node; and
 said mirror motor being adapted to move said mirror in response to another set of said messages from said first wireless control node.

7. The apparatus of claim 1 further including:
a third module positioned at a third location within the vehicle, said third module having a fourth wireless control node;
a fourth module positioned at a fourth location within the vehicle, said fourth module having a fifth wireless control node;
additional devices being coupled to each of said fourth wireless control node and said fifth wireless control node;
each of said additional devices being adapted to perform a predetermined function in response to a selected message from said wireless control node coupled thereto; and
said fourth wireless control node and said fifth wireless control node being adapted to form a virtual network with each other and with said first wireless control node and said second wireless control node so that said wireless control nodes can communicate the messages to each other to enable some of said wireless control nodes to utilize the messages from others of said wireless nodes to control the function of at least one of the devices coupled thereto.

8. A method for communicating messages for controlling the functions of devices within a vehicle, each of the devices being adapted to perform a predetermined function in response to a selected message from a wireless control node coupled thereto; said method comprising the steps of:
placing a first wireless control node at a first location in the vehicle;
placing a second wireless control node at second location in the vehicle;
enabling the first wireless control node and the second wireless control node to form a virtual network so that the first wireless control node and said second wireless control node can communicate at least one message to each other to actuate a device;
positioning a third wireless control node external to the vehicle;
enabling said third wireless control node to become part of said virtual network so that said third wireless control node can communicate a message to at least one of said first wireless control node and said second wireless control node;
further enabling at least one of said first wireless control node and said second wireless control node to utilize a message from said third wireless control node to further actuate the functioning of at least one of the devices within the vehicle;
verifying that said virtual network has been formed;
authenticating that said message from said third wireless control node is a valid message;
conveying said message to at least one of said first control wireless node and said second wireless control node in response to said authentication of the validity of the message;
providing a command to a device in response to said message;
associating a wireless control node with each door of the vehicle;
coupling a manual controller to each of said wireless control nodes associated with each door of the vehicle;
adapting each of said manual controllers to initiate a message in response to actuation of said manual controller by an operator thereof; and
arranging at least one of said wireless control nodes to send said message initiated by said manual controller coupled thereto to at least one other wireless control node to control a device coupled to said other wireless control node.

9. The method of claim 8 further including the steps of:
providing a plurality of other systems in the vehicle;
causing each of said systems to perform a different function relating to the operation of devices associated with the vehicle;
utilizing a data bus to communicate with said other systems; and
enabling a gateway to communicate between said data bus and at least one of said wireless control nodes.

10. The method of claim 8 further including the steps of:
providing a door lock motor for operating a door lock associated with a vehicle door;
adapting said door lock to perform the functions of locking and unlocking said vehicle door associated therewith in response to said operations of said door lock motor in response to selected messages; and
enabling said third control node to provide said selected messages to at least one of said first wireless control node and said second wireless control node.

11. The method of claim 8 further including the steps of:
providing a window and a mirror associated with each of the doors of the vehicle;
further providing a window motor and a mirror motor for respectively operating said window and said mirror;
adapting at least one of said window motors to perform the function of moving said window in response to a set of said messages from at least one of said wireless control nodes; and
adapting at least one of said mirror motors to move said mirror in response to another set of said messages from at least one of said wireless control nodes.

12. The method of claim 8 further including the steps of:
coupling manual controllers to said devices; and
adapting said manual controllers to provide messages to control the functioning of a selected one of said devices in response to an operator actuating at least one of said manual controllers.

* * * * *